United States Patent
Hanes

(10) Patent No.: US 10,580,266 B2
(45) Date of Patent: Mar. 3, 2020

(54) INDICATOR TO INDICATE A STATE OF A PERSONAL ASSISTANT APPLICATION

(71) Applicant: HEWLETT-PACKARD DEVELOPMENT COMPANY, L.P., Houston, TX (US)

(72) Inventor: David H. Hanes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/089,248

(22) PCT Filed: Mar. 30, 2016

(86) PCT No.: PCT/US2016/025028
§ 371 (c)(1),
(2) Date: Sep. 27, 2018

(87) PCT Pub. No.: WO2017/171756
PCT Pub. Date: Oct. 5, 2017

(65) Prior Publication Data
US 2019/0114880 A1    Apr. 18, 2019

(51) Int. Cl.
G08B 5/36    (2006.01)
H04R 3/00    (2006.01)
G06F 3/16    (2006.01)
H04B 1/38    (2015.01)
H04R 1/04    (2006.01)

(52) U.S. Cl.
CPC .............. *G08B 5/36* (2013.01); *G06F 3/167* (2013.01); *H04B 1/38* (2013.01); *H04R 1/04* (2013.01); *H04R 3/00* (2013.01); *H04R 2227/003* (2013.01); *H04R 2420/07* (2013.01)

(58) Field of Classification Search
CPC .. G08B 5/36; G06F 3/167; H04B 1/38; H04R 1/04
USPC ..................................................... 340/815.45
See application file for complete search history.

(56) References Cited

U.S. PATENT DOCUMENTS

| | | | |
|---|---|---|---|
| 6,380,852 B1 | 4/2002 | Hartman et al. | |
| 7,187,768 B1 * | 3/2007 | Papadopoulos | H04M 1/6066 379/428.02 |
| 8,049,655 B2 | 11/2011 | Conway, Jr. et al. | |
| 9,153,106 B1 * | 10/2015 | Kuscher | G08B 5/36 |

(Continued)

FOREIGN PATENT DOCUMENTS

| | | |
|---|---|---|
| CN | 101008892 | 8/2007 |
| CN | 102304996 | 1/2012 |

(Continued)

OTHER PUBLICATIONS

"Accessible Design of Consumer Products", http://trace.wisc.edu/docs/consumer_product_guidelines/consumer.pcs/output. html, 15 pages.

(Continued)

*Primary Examiner* — Omar Casillashernandez
(74) *Attorney, Agent, or Firm* — Fabian VanCott

(57) ABSTRACT

A portable transceiver unit includes: a microphone to receive spoken voice commands from a user; a wireless transceiver to wirelessly communicate with a host computer; and an indicator to indicate a state of a personal assistant application executing on the host computer based on data received from the host computer by the wireless transceiver.

20 Claims, 5 Drawing Sheets

(56) References Cited

U.S. PATENT DOCUMENTS

| | | | |
|---|---|---|---|
| 9,635,696 B1* | 4/2017 | Liu | H04W 4/80 |
| 9,675,871 B1* | 6/2017 | Jetter | A63F 13/00 |
| 2008/0268776 A1* | 10/2008 | Amendola | H04W 12/06 |
| | | | 455/41.2 |
| 2010/0086153 A1 | 4/2010 | Hagen et al. | |
| 2010/0215170 A1* | 8/2010 | Kannappan | H04L 12/66 |
| | | | 379/418 |
| 2011/0223865 A1 | 9/2011 | Liu | |
| 2013/0139103 A1 | 5/2013 | Laborczfalvi et al. | |
| 2013/0219525 A1* | 8/2013 | Soffer | G06F 3/162 |
| | | | 726/34 |
| 2013/0316746 A1* | 11/2013 | Miller | H04L 51/30 |
| | | | 455/466 |
| 2014/0362024 A1* | 12/2014 | Hicks | G06F 3/167 |
| | | | 345/174 |
| 2015/0038121 A1* | 2/2015 | Koum | H04L 51/10 |
| | | | 455/412.2 |
| 2015/0089373 A1* | 3/2015 | Dwivedi | G06F 3/167 |
| | | | 715/728 |
| 2015/0095465 A1 | 4/2015 | Yeh | |
| 2015/0109441 A1* | 4/2015 | Fujioka | H04N 7/183 |
| | | | 348/143 |
| 2015/0164323 A1* | 6/2015 | Holtzclaw | A61B 5/0022 |
| | | | 600/365 |
| 2015/0350762 A1* | 12/2015 | Birger | H04R 1/1016 |
| | | | 381/74 |
| 2016/0022167 A1* | 1/2016 | Simon | A61B 5/04842 |
| | | | 600/301 |
| 2016/0165645 A1* | 6/2016 | Commons | H04W 8/24 |
| | | | 455/420 |
| 2016/0192055 A1* | 6/2016 | Liu | H04R 1/1041 |
| | | | 381/74 |
| 2017/0048613 A1* | 2/2017 | Smus | H04M 1/7253 |
| 2017/0242649 A1* | 8/2017 | Jarvis | G10L 15/14 |
| 2018/0014140 A1* | 1/2018 | Milevski | H04S 7/304 |
| 2018/0048750 A1* | 2/2018 | Hardi | B60K 35/00 |
| 2019/0057703 A1* | 2/2019 | Zeinstra | G10L 15/30 |

FOREIGN PATENT DOCUMENTS

| | | |
|---|---|---|
| CN | 102510426 | 6/2012 |
| CN | 103038738 | 4/2013 |
| CN | 104820798 | 8/2015 |
| CN | 105122353 | 12/2015 |
| CN | 105302007 | 2/2016 |
| KR | 101104354 | 1/2012 |
| WO | WO-2014/110104 A1 | 7/2014 |

OTHER PUBLICATIONS

Anonymous: Amazon Echo Ultimate User's Guide Time XP055572891.

Anonymous: Amazon.com Help: About the Light Ring XP055623055.

* cited by examiner

INDICATOR TO INDICATE A STATE OF A PERSONAL ASSISTANT APPLICATION

BACKGROUND

Portable wireless speakers allow a user to connect wirelessly to a source of audio data, such as a computer. The user can then take the speaker unit to other rooms within a home or office, for example, while streaming music from the stationary store of audio data.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

Figure 1:
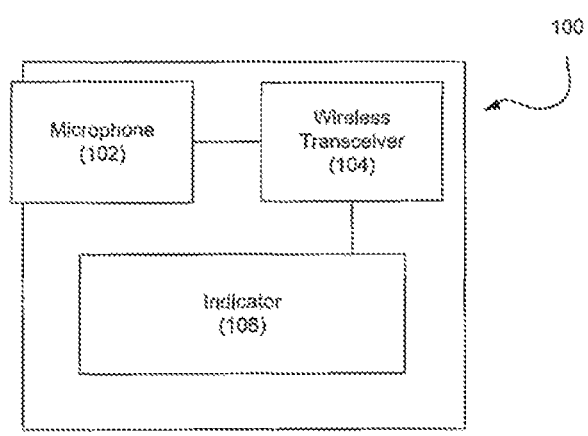
FIG. 1 is an illustration of an example portable transceiver unit consistent with the disclosed implementations.

The internet provides a tremendous wealth of information that can be searched and browsed using internet search engines. Additionally, users may keep significant personal information online such as a personal or business calendar, list of contacts and social connections, etc. With such information being stored on the internet, it can be accessed by the user from a variety of devices, such as a personal computer or a smart phone.

To help manage all of this information and functionality, various personal assistant applications are becoming popular. Examples of such personal assistant applications include Siri® from Apple, Inc, OK Google® from Google, Inc. and Cortana® from Microsoft Corporation.

A principal feature of these personal assistant applications is the ability of the user to give voice commands. The personal assistant application will process the audio of the spoken command with speech recognition and take action accordingly.

For example, the user may ask a question using natural language. The question may cause the personal assistant application to execute an interest search for the answer. Alternatively, the question might be about the user's schedule, causing the personal assistant application to retrieve an answer from the user's electronic calendar.

Frequently, the personal assistant application will provide a verbal response to the user's vocal input. For example, the personal assistant application may verbally stats the answer to the question the user has asked.

Because of the convenience of such verbal interfacing, personal assistant applications are particularly popular on mobile devices, such as smart phones, where a full size keyboard, monitor and other such user input devices are not available. However, personal assistant applications are also widely used on larger computers, such as laptop and desktop computers, which are stationary or less portable than a smart phone.

As noted above, portable wireless speaker units allow a user to connect wirelessly to a source of audio data, such as a computer. The user can then take the speaker unit to other rooms within a home or office, for example, while streaming music from the stationary stone of audio data.

The present specification proposes a portable transceiver unit to allow a user to remotely access, for example, a personal assistant application that is running on a computer with which the portable transceiver unit is in wireless communication. This computer may be, for example, a laptop, a larger personal computer or even a server that is generally stationary where the user may want to access the personal assistant application on that computer from a remote location and can now do so with the portable transceiver unit described here.

This portable transceiver unit includes one or more microphones into which the user can issue a voice command. The portable transceiver unit than transmits the voice command to its host computer and the personal assistant application executing thereon. The personal assistant application then processes the voice command and transmits a response to the portable transceiver unit.

The portable transceiver unit may incorporate a speaker or system of speakers. The portable transceiver unit may use its speaker to output a verbal response from the personal assistant application. Additionally, the portable transceiver unit with speakers may also serve as a portable speaker unit with which a user car wirelessly stream audio from the host computer supporting the portable unit. Alternatively, the functionality of the portable transceiver unit described here could be added to a unit previously purposed only as a portable speaker unit.

However, using the personal assistant application remotely, the user will not have available the visual cues available at the host computer indicating the status of the personal assistant application. For example, the user will not know if the personal assistant application is ready, busy, needs to be launched or any other state that could be ascertained from the visual display of the host computer. Consequently, the present specification proposes to provide a visual indicator of the status of the personal assistant application at the portable transceiver unit.

Thus, in one example, the present specification describes a portable transceiver unit including: A portable transceiver unit comprising: a microphone to receive spoken voice commands from a user; a wireless transceiver to wirelessly communicate with a host computer; and an indicator to indicate a state of a personal assistant application executing on the host computer based on data received from the host computer by the wireless transceiver.

In another example, the present specification describes a host computer including: a processor; memory to support the processor; a wireless transceiver to communicate with a portable transceiver unit; a personal assistant application; and a monitor to determine a state of the personal assistant application and signal an indication of that state of the personal assistant application to the portable transceiver unit using the wireless transceiver.

In another example, the present specification describes a method including: at a portable wireless transceiver that is remote from a host computer, receiving a determination of a slate of a personal assistant application on the host computer; and indicating the state of a personal assistant application on the host computer with an indicator on the portable wireless transceiver that is remote from the host computer.

As used herein and in the following claims, the term "portable transceiver unit" will refer to a portable unit for wirelessly interfacing and communicating with a separate host computer such that a user can operate the portable transceiver unit to both send and receive data to and from the host computer from a location removed from the actual location of the computer itself within range of the wireless communication between the portable transceiver unit and the host computer.

As used herein and in the following claims, the term "host computer" or "computer" will refer to a computer for interfacing with the portable transceiver unit, sending and receiving signals to and from the portable transceiver unit. The host computer or computer could be any computerized device capable of supporting the portable transceiver unit including, but not limited to, a laptop computer, notebook computer, tablet computer, personal computer, desktop computer or server.

As used herein and in the following claims, the term "dongle" refers to a self-contained unit for connection to a host computer. The dongle providing additional functionality to the host computer, such as an interface with a portable transceiver unit.

In the following description, for purposes of explanation, specific details are set forth in order to provide a thorough understanding of the disclosure. It will be apparent, however, to one skilled in the art that examples consistent with the present disclosure may be practiced without these specific details. Reference in the specification to "an implementation," "an example" or similar language means that a particular feature, structure, or characteristic described in connection with the implementation or example is included in at least that one implementation, but not necessarily in other implementations. The various instances of the phrase "in one implementation" or similar phrases in various places in the specification are not necessarily all referring to the same implementation.

FIG. 1 is an illustration of an example portable transceiver unit consistent with the disclosed implementations. As shown in FIG. 1, the portable transceiver unit (100) includes a microphone (102), a wireless transceiver (104) and an indicator (106). The microphone (102) may be a single microphone or may be multiple microphones located at different locations on the portable transceiver unit (100). Multiple microphones on the portable transceiver unit (100) may provide better directional coverage.

With the microphone (102), the portable transceiver unit (100) can receive a voice command from a user. This voice command may be a voice command established for invoking a response on a host computer supporting the portable transceiver unit (100). More specifically, the voice command may be input for a personal assistant application executing on the supporting host computer.

The voice command, after being transduced by the microphone (102), is provided to the wireless transceiver (104). The wireless transceiver (104) wirelessly transmits the data of the voice command to the supporting host computer. The wireless transceiver (104) will also receive any response from the host computer and output that response for the user of the portable transceiver unit (100)

However, as noted above, because the user is possibly remote from the host computer, the user may not know or be able to readily ascertain the state or status of the personal assistant application. If the user were located at the host computer, the user could determine the state of the personal assistant application using the visual display of the host computer. For example, if the personal assistant application is executing on the host computer, the display would typically include some output or visual element indicating the state of the application.

Consequently, the portable transceiver unit (100) includes an indicator (106) that provides, at the portable transceiver unit (100), an indication of the state of the personal assistant application, as will be described in detail below. The indicator (106) may be any device capable of signaling to the user a state of the personal assistant application, for example, a visual indicator. The status of the personal assistant application can be transmitted by the host computer to the portable transceiver unit (100) via the wireless transceiver (104) which signals the indicator (106) to indicate the appropriate status.

In some examples, the state of the personal assistant application is that the personal assistant is not available. This may be the case because the application has not been launched or the host computer itself is unavailable. The host computer may be unavailable because, for example, it is in a low-power mode or is locked and requires login credentials before undertaking any other functions. Any of these examples will be considered as a possible state of the personal assistant application.

Thus, in some examples, the portable transceiver unit (100) may be used to send a command to launch the personal assistant application that is not presently available. The personal assistant application could be launched in response to a voice command made by the user at the portable transceiver unit (100) and transmitted to the host computer. Alternatively, the portable transceiver unit (100) may include a dedicated button for signaling the host computer to launch the personal assistant application.

Figure 2:
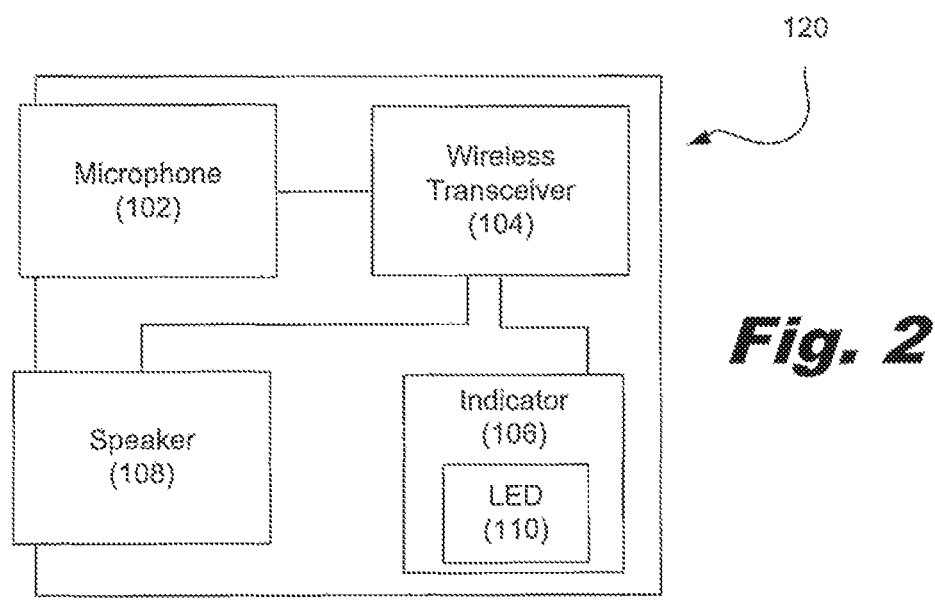
FIG. 2 is another illustration of an example portable transceiver unit consistent with the disclosed implementations.

FIG. 2 is another illustration of an example portable transceiver unit consistent with the disclosed implementations. A shown in FIG. 2, the portable transceiver unit (120) also includes a microphone (102) wireless transceiver (104) and indicator (106), as described above.

Additionally, the portable transceiver unit (120) includes a speaker (108). This may be a system of any number of different speakers. The speaker (108) may be a high fidelity speaker and occupy the majority of the bulk of the portable transceiver unit (120). Consequently, the portable transceiver unit (120) can be used additionally or primarily as a portable speaker unit to stream audio from the host computer.

In the illustrated example, the indicator (106) includes a Light Emitting Diode (LED) (110) as a visual indicator. In some examples, this could be a series of LEDs each being lit to indicate a different state of the personal assistant application. Alternatively, the indicator (106) may include a single LED that changes color, intensify, blink pattern or some combination of those to indicate different states of the personal assistant application.

In one possible example, the LED may be dimly lit to indicate that the portable transceiver unit (120) is connected to the host computer. When the user issues a verbal prompt to indicate a command for the personal assistant application, the LED becomes brighter. The user then issues a verbal command, such as asking a question, for the personal assistant application, as described above. The LED may be blink or pulse to indicate that the personal assistant application is working on the verbal command. Thereafter, the response from the personal assistant application is received by the portable transceiver unit (120) and output through the speaker (108). After the response is complete, the LED will return to the initial dimly lit condition awaiting the next prompt and command from the user. Again, the indicator (106) may use changes in color, intensity, blink pattern or some combination of these to indicate different states of the personal assistant application.

Figure 3:
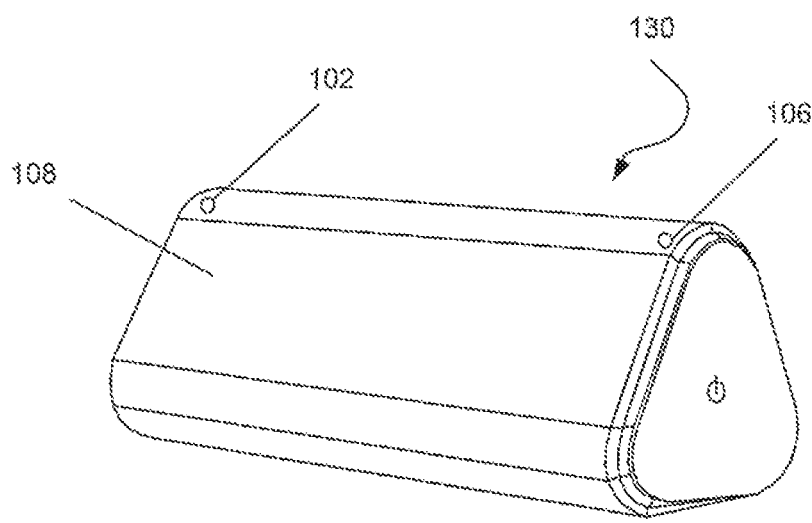
FIG. 3 is an illustration of an example portable speaker unit incorporating a portable transceiver unit consistent with the disclosed implementations.

FIG. 3 is an illustration of an example portable speaker unit incorporating a portable transceiver unit consistent with the disclosed implementations. As shown in FIG. 3, a portable speaker unit (130) including a speaker system (108). Though not shown in this figure, this unit (130) will include the wireless transceiver as described above in connection with FIG. 2. The portable speaker unit (130) also includes the microphone (102) and the indicator (106) as described above.

Figure 4:
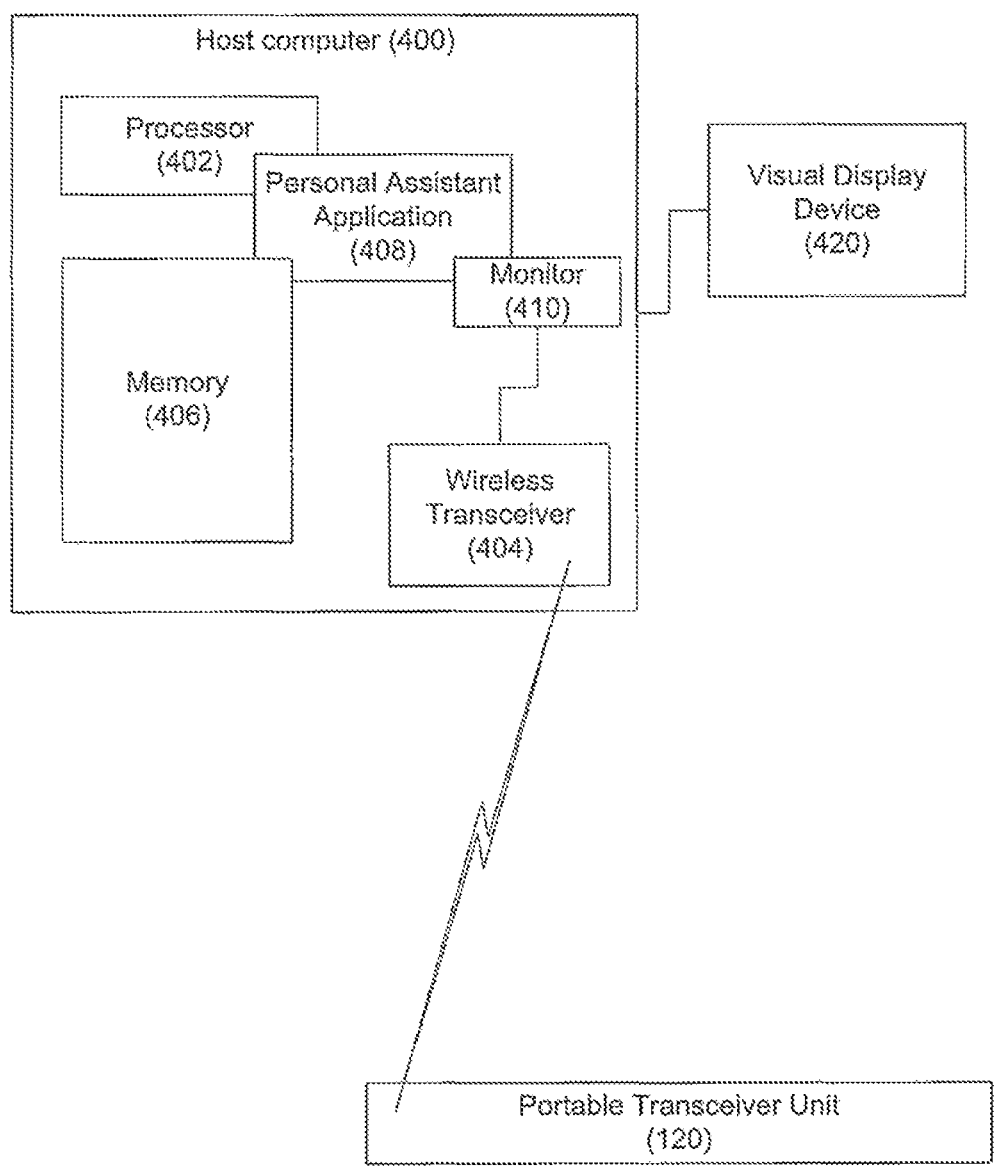
FIG. 4 is an illustration of a host computer and portable transceiver unit consistent with the disclosed implementations.

FIG. 4 is an illustration of a host computer and portable transceiver unit consistent with the disclosed implementations. As shown in FIG. 4, the host computer (400) includes a processor (402) or central processing unit and memory (406) to support the operation of the processor (402). The memory (406) will include both Random Access Memory (RAM) and a data storage device, such as a hard drive or solid state drive.

The host computer (400) also incorporates a personal assistant application (408). Before being launched, this application (408) is code stored in the memory (406). Upon launch, the application (408) is instantiated and becomes an operative element of the host computer (400).

A monitor (410) is also provided to ascertain the state of the personal assistant application (408). The monitor (410) communicates that state via the wireless transceiver (404) of the host computer (400) to the portable transceiver unit (120).

As noted above, the host computer (400) could be any of a number of different computerized devices. The communication between the host computer (400) and the portable transceiver unit (120) can use any wireless protocol, for example, Bluetooth or a wireless local area network (WiFi).

In some cases the host computer (400) may not have the capability to directly interface with the portable transceiver unit (120) described herein. In such cases, or for other reasons, a dongle may be provided and connected to the host computer (400). The dongle will incorporate a wireless transceiver for communication with the portable transceiver unit (120) and its wireless transceiver (104). The dongle may draw power from the host computer (400) may input signals front the portable transceiver unit (120) to the host computer (400).

The monitor (410) may be a software or firmware element executed by the processor (402). Alternatively, the monitor (410) may be a hardware element, such as an Application Specific Integrated Circuit (ASIC) in the host computer (400).

The monitor (410) may ascertain the state of the personal assistant application (408) in any of a variety of ways. For example, the monitor (410) may use an Application Program Interface (API) of the personal assistant application (408) to directly ascertain the state of the application (408). Alternatively, the monitor (410) may interface with an operating system of the host computer to determine the state of the personal assistant application (408). For example, the monitor (410) may check the processes running on the host computer (400) and look for processes specifically related to the personal assistant application. For example, if a process central to operation of the personal assistant application changes from a suspended to a running state, the monitor (410) may infer that the personal assistant application is active.

Additionally, as noted above, the status of the personal assistant application may be designated on a visual display device (420) of the host computer (400). For example, an application window or a pop-up window may be displayed on the display device (420) and indicate a state of the personal assistant application. Consequently, the monitor (410) can observe what is being displayed on the visual display device (420) of the host computer to ascertain a status of the personal assistant application (408). For example, the monitor (410) may produce and analyze a color histogram of output from or about the personal assistant application (408) displayed on the display device (420) to determine a status of the personal assistant application (408).

Lastly, the monitor (410) may analyze audio output from the personal assistant application (408) to determine the state of the personal assistant application (408). For example, if the application (408) annunciates a response or announcement with an audio signal, either for local or remote speakers, this audio output can be detected by the monitor (410) as an indication that the personal assistant application (408) is active. Additionally, the monitor (410) may analyze what audio the personal assistant application (408) has output to more specifically determine the state of the application (408).

Any combination of these or other techniques may be used by the monitor (410) to determine, with varying degrees of specificity, the status of the personal assistant application (408). That status or state is then signaled to the portable transceiver unit (120), where the indicator described above gives the user an indication of the state of the personal assistant application (408).

Figure 5:
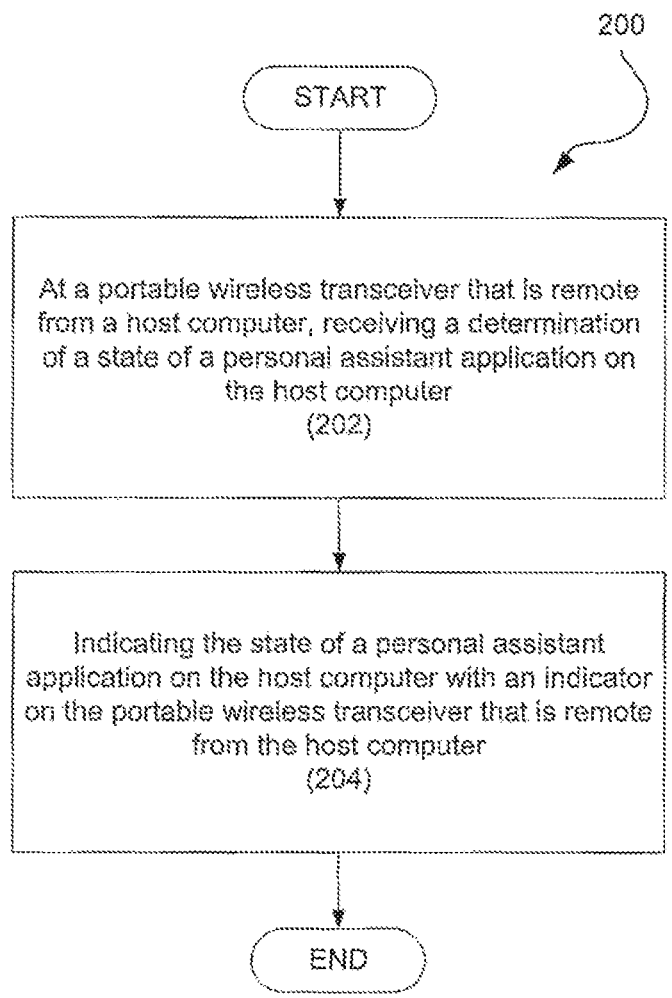
FIG. 5 is a flowchart of an example method of using a portable transceiver unit to indicate a status of a personal assistant application consistent with the disclosed implementations.

FIG. 5 is a flowchart of an example method of using a portable transceiver unit to indicate a status of a personal assistant application consistent with the disclosed implementations. The illustrated method includes, at a portable wireless transceiver that is remote from a host computer, receiving (202) a determination of a state of a personal assistant application on the host computer; and indicating (204) the state of a personal assistant application on the host computer with an indicator on the portable wireless transceiver that is remote from the host computer.

Figure 6:
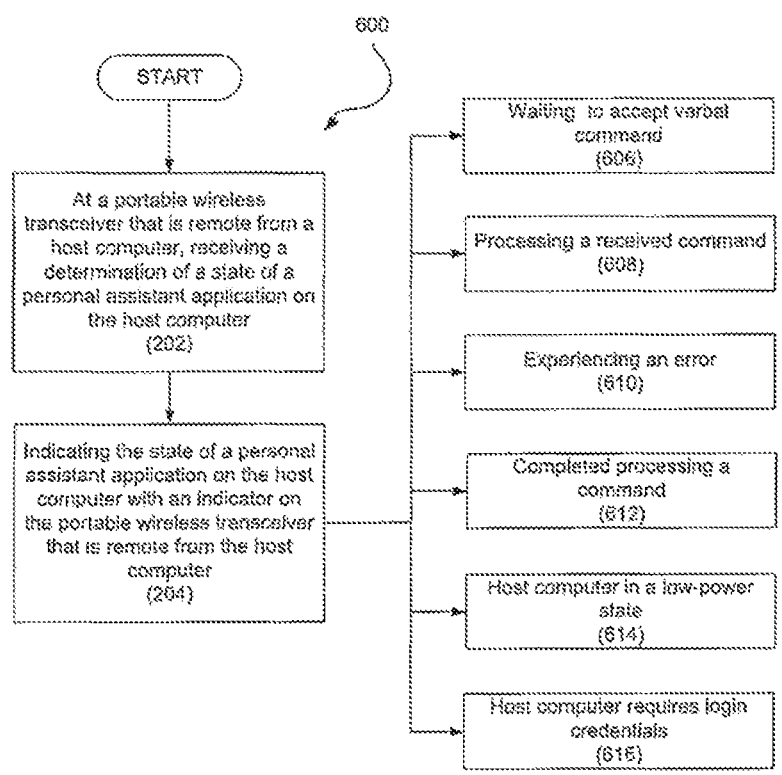
FIG. 6 is a flowchart of another example method of using a portable transceiver unit to indicate a status of a personal assistant application consistent with the disclosed implementations.

FIG. 6 is a flowchart of another example method of using a portable transceiver unit to indicate a status of a personal assistant application consistent with the disclosed implementations. Similar to FIG. 5 above, as shown in FIG. 6, the method (600) includes at a portable wireless transceiver unit that is remote from a host computer, receiving (202) a determination of a state of a personal assistant application on the host computer; and indicating (204) the state of a personal assistant application on the host computer with an indicator on the portable wireless transceiver unit that is remote from the host computer.

FIG. 6 further illustrates a number of possible states of the personal assistant application that might be indicated by the indicator on the portable wireless transceiver unit. As shown in FIG. 6, these states include: waiting to accept a verbal command (606), processing a received command (608), experiencing an error (610), has completed processing a command (612), the host computer is in a low-power state (614) and the host computer requires login credentials to continue (616). This list is merely exemplary. The indicator can indicate more or fewer different states of the corresponding personal assistant application.

The indicator described herein may be a visual indicator, as in the example of using an LED. Alternatively, however, the indicator could be a verbal announcement of the status of the personal assistant application made though the speaker system of the portable transceiver unit. The portable transceiver unit may have a dedicated button or may accept a specific spoken command as a trigger to state verbally, using its speaker system, the current state of the personal assistant application. In such a case, the monitor described above may include a memory storing a range of such announcements and an audio circuit to output the appropriate status message to the speaker system of the portable transceiver unit.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A portable transceiver unit comprising:
a microphone to receive spoken voice commands from a user;
a wireless transceiver to wirelessly communicate with a host computer; and
an indicator to indicate a state of a personal assistant application executing on the host computer based on data received from the host computer by the wireless transceiver.

2. The portable transceiver unit of claim 1, wherein the indicator comprises a Light Emitting Diode (LED).

3. The portable transceiver unit of claim 1, wherein the wireless transceiver is one of a Bluetooth and WiFi transceiver.

4. The portable transceiver unit of claim 1, wherein the indicator signals when the personal assistant application is waiting to accept a verbal command.

5. The portable transceiver unit of claim 1, wherein the indicator signals when the personal assistant application is processing a received command from the portable transceiver unit.

6. The portable transceiver unit of claim 1, wherein the indicator signals when the personal assistant application has experienced an error attempting to process a command received from the portable transceiver unit.

7. The portable transceiver unit of claim 1, wherein the indicator signals when the personal assistant application has completed processing a command from the portable transceiver unit.

8. A host computer comprising:
a processor;
memory to support the processor;
a wireless transceiver to communicate with a portable transceiver unit;
a personal assistant application to execute an action based on a received voice command; and
a monitor to:
determine a state of the personal assistant application by monitoring processes running on the host computer associated with the personal assistant application; and
signal an indication of that state of the personal assistant application to the portable transceiver unit using the wireless transceiver.

9. The host computer of claim 8, the monitor to hook to the personal assistant application to determine the state of the personal assistant application.

10. The host computer of claim 8, the monitor to interface with an operating system of the host computer to determine the state of the personal assistant application.

11. The host computer of claim 8, the monitor to analyze output from the personal assistant application to determine the state of the personal assistant application.

12. The host computer of claim 11, the monitor to analyze a color histogram of output from the personal assistant application displayed on a display device of the host computer to determine the state of the personal assistant application.

13. The host computer of claim 11, the monitor to analyze audio output from the personal assistant application to determine the state of the personal assistant application.

14. A method comprising:
at a portable wireless transceiver that is remote from a host computer, receiving a determination of a state of a personal assistant application on the host computer by monitoring processes running on the host computer associated with the personal assistant application, which personal assistant application is to execute an action based on a received voice command; and
indicating different states of a personal assistant application on the host computer with an indicator on the portable wireless transceiver that is remote from the host computer, wherein:
the state of the personal assistant application relates to a processing of the received voice command; and
different states of the personal assistant application comprise:
receiving a command indicated by a light emitting diode (LED) increasing in brightness;
processing the command indicated by the LED pulsating; and
completing the command indicated by the LED decreasing in brightness.

15. The method of claim 14 further comprising indicating any one of:
that the personal assistant application is waiting to accept a command; that the personal assistant application is processing a received command from the portable transceiver unit; that the personal assistant application has experienced an error attempting to process a command relieved from the portable transceiver unit; that the personal assistant application has completed processing a command from the portable transceiver unit; that the host computer is in a low-power state; and that the host computer requires login credentials.

16. The portable transceiver unit of claim 1, wherein a voice command launches the personal assistant application executing on the host computer.

17. The portable transceiver unit of claim 1, wherein the at least one indicator comprises multiple indicators, each to indicate a different state of the personal assistant application.

18. The portable transceiver unit of claim 1, wherein the at least one indicator comprises a single indicator to change at least one of an emitting color, intensity, or blink pattern to indicate different states of the personal assistant application.

19. The host computer of claim 8, wherein the received voice command invokes a verbal response.

20. The host computer of claim 19, wherein the verbal response is output on a speaker of the portable transceiver unit.

* * * * *